(12) United States Patent
Sasai

(10) Patent No.: US 10,900,832 B2
(45) Date of Patent: Jan. 26, 2021

(54) DIFFRACTION GRATING AND SPECTRAL DEVICE

(71) Applicant: Shimadzu Corporation, Kyoto (JP)

(72) Inventor: Hiroyuki Sasai, Kyoto (JP)

(73) Assignee: Shimadzu Corporation, Kyoto (JP)

(*) Notice: Subject to any disclaimer, the term of this patent is extended or adjusted under 35 U.S.C. 154(b) by 69 days.

(21) Appl. No.: 16/095,191

(22) PCT Filed: Jun. 6, 2016

(86) PCT No.: PCT/JP2016/066748
§ 371 (c)(1),
(2) Date: Oct. 19, 2018

(87) PCT Pub. No.: WO2017/212522
PCT Pub. Date: Dec. 14, 2017

(65) Prior Publication Data
US 2019/0145824 A1    May 16, 2019

(51) Int. Cl.
*G01J 3/18* (2006.01)
*G02B 5/18* (2006.01)
*G01J 3/02* (2006.01)

(52) U.S. Cl.
CPC . *G01J 3/18* (2013.01); *G01J 3/02* (2013.01); *G02B 5/1861* (2013.01); *G02B 5/1847* (2013.01)

(58) Field of Classification Search
CPC .............. G01J 3/18; G01J 3/02; G02B 5/1861
See application file for complete search history.

(56) References Cited

U.S. PATENT DOCUMENTS 4,886,341 A * 12/1989 Oishi .................. G02B 5/1861
359/575
6,480,333 B1 * 11/2002 Maker ................. G02B 5/1857
359/570
(Continued)

FOREIGN PATENT DOCUMENTS

DE    10 2012 208 906 A1    11/2013
DE    102012208906 A1 *     11/2013
(Continued)

OTHER PUBLICATIONS

International Search Report dated Aug. 30, 2016, in PCT/JP2016/066748 filed Jun. 6, 2016.
(Continued)

*Primary Examiner* — Maurice C Smith
(74) *Attorney, Agent, or Firm* — Oblon, McClelland, Maier & Neustadt, L.L.P.

(57) ABSTRACT

An irradiation region 21 of a diffraction grating 2 includes a first irradiation region (21A) and a second irradiation region (21B). In the diffraction grating 2, a blaze wavelength of a groove 22 of the first irradiation region (21A) is different from a blaze wavelength of a groove 23 of the second irradiation region (21B). That is, the first irradiation region (21A) and the second irradiation region (21B) have different relationships between a wavelength of light to be spectrally dispersed and a diffraction efficiency. Therefore, in a spectral device, light on a short wavelength side of light reflected by the second irradiation region (21B) of the diffraction grating 2 is not diffracted and is not received by a detector. Then, in a spectral device 1, aberration on the short wavelength side is corrected. In this way, in the diffraction grating 2, an aberration can be corrected with a simple structure in which the grooves (22, 23) are formed such that the blaze wavelengths in the first irradiation region
(Continued)

(21A) and the second irradiation region (21B) are different from each other.

12 Claims, 10 Drawing Sheets

(56) References Cited

U.S. PATENT DOCUMENTS

| | | | | |
|---|---|---|---|---|
| 2001/0046087 A1* | 11/2001 | Hoose | ............... | G02B 6/2931 |
| | | | | 359/573 |
| 2006/0146422 A1* | 7/2006 | Koike | ............... | G02B 5/188 |
| | | | | 359/742 |
| 2011/0102898 A1* | 5/2011 | Korenaga | ............... | G02B 13/003 |
| | | | | 359/570 |
| 2011/0242950 A1* | 10/2011 | Komma | ............... | G11B 7/1353 |
| | | | | 369/30.04 |
| 2015/0355394 A1* | 12/2015 | Valera | ............... | G02B 5/1828 |
| | | | | 359/571 |
| 2016/0320237 A1* | 11/2016 | Ni | ............... | G01J 3/28 |

FOREIGN PATENT DOCUMENTS

| | | |
|---|---|---|
| JP | 2518505 B2 | 7/1996 |
| JP | 2002-342967 A | 11/2002 |
| JP | 2003-4924 A | 1/2003 |
| JP | 2004-354539 A | 12/2004 |

OTHER PUBLICATIONS

Written Opinion of the International Searching Authority idated Aug. 30, 2016, in PCT/JP2016/066748 filed Jun. 6, 2016, with an English Translation.

Japanese Office Action dated Feb. 18, 2020 in Patent Application No. 2018-522181 (with English translation), 8 pages.

* cited by examiner

DIFFRACTION GRATING AND SPECTRAL DEVICE

TECHNICAL FIELD

The present invention relates to a diffraction grating that diffracts light irradiated onto an irradiation region and spectrally disperses the light into lights of respective wavelengths, and relates to a spectral device having the diffraction grating.

TECHNICAL BACKGROUND

Conventionally, a spectral device having a diffraction grating is used. In the spectral device, light is irradiated towards an irradiation region of the diffraction grating. Then, in the diffraction grating, the irradiated light is diffracted and spectrally dispersed into lights of respective wavelengths (for example, see Patent Document 1 below).

In such a spectral device, in general, various aberrations are likely to occur. For example, in the spectral device, aberrations such as a spherical aberration, a coma aberration, an astigmatism and a chromatic aberration are likely to occur. These aberrations are caused by shapes of members in an optical system, differences between refractive indexes of respective wavelengths of light, or the like, and adversely affect resolutions of respective wavelengths.

In the spectral device (spectroscope) described in Patent Document 1, aberrations occurred in the spectral device as described above are corrected by manufacturing (exposing) the diffraction grating under a predetermined condition and arranging an optical system under a predetermined condition.

RELATED ART

Patent Document
[Patent Document 1] Japanese Patent No. 2518505.

SUMMARY OF THE INVENTION

Problems to be Solved by the Invention

In the conventional spectral device as described above, the condition for manufacturing (structuring) the diffraction grating is complicated (limited). Therefore, there is a problem that it is difficult to correct an aberration with a simple structure.

The present invention is accomplished in view of the above-described situation and is intended to provide a diffraction grating and a spectral device that allow an aberration to be corrected with a simple structure.

Means for Solving the Problems (1) A diffraction grating according to the present invention diffracts light irradiated onto an irradiation region and spectrally disperses the light into lights of respective wavelengths. In the diffraction grating, multiple grooves for diffracting light are formed in the irradiation region, and, among the multiple grooves, at least some grooves have a blaze wavelength that is different from that of the other grooves, the blaze wavelength being a wavelength at which a diffraction efficiency peaks.

Normally, grooves are formed in a diffraction grating. Then, a relationship between a wavelength of light to be spectrally dispersed and a diffraction efficiency differs (diffraction efficiencies for respective wavelengths of light after being spectrally dispersed differ) depending on shapes of the grooves formed in the diffraction grating. Further, in the diffraction grating, of the spectrally dispersed light, a wavelength at which the diffraction efficiency peaks is referred to as a blaze wavelength. In this way, the blaze wavelength is a value unique to the diffraction grating (the shapes of the grooves formed in the diffraction grating). When the blaze wavelength of the diffraction grating is different, for the light after being spectrally dispersed, the relationship between the wavelength and the diffraction efficiency regarding at which wavelength the diffraction efficiency becomes high and at which wavelength the diffraction efficiency becomes low is different.

According to the above structure, in the diffraction grating, among the multiple grooves formed in the irradiation region, at least some grooves are formed so as to have a blaze wavelength different from that of the other grooves. For example, in the irradiation region of the diffraction grating, when grooves are formed such that a diffraction efficiency is low in a portion where an aberration is likely to occur and grooves are formed such that a diffraction efficiency is high in a portion where an aberration is unlikely to occur, an aberration occurring in the diffraction grating can be corrected.

Therefore, an aberration occurring in the diffraction grating can be corrected with a simple structure in which the grooves are formed such that the blaze wavelength is different between at least a portion of the irradiation region of the diffraction grating and the other portion of the irradiation region of the diffraction grating.

(2) Further, among the multiple grooves, grooves positioned in a center portion of the irradiation region may have a blaze wavelength smaller than a blaze wavelength of grooves positioned on an outer side.

According to such a structure, an aberration occurring in the diffraction grating can be corrected with a simple structure in which the blaze wavelength of the grooves positioned in the center portion of the diffraction grating is smaller than the blaze wavelength of the grooves positioned on the outer side.

(3) Further, among the multiple grooves, grooves positioned in a center portion in a dispersive direction of light may have a blaze wavelength smaller than a blaze wavelength of grooves positioned on an outer side in the dispersive direction.

According to such a structure, an aberration (a spherical aberration, a coma aberration, or the like) caused by a difference in position (reflection position) in the dispersive direction in the diffraction grating can be corrected with a simple structure.

(4) Further, among the multiple grooves, grooves positioned in a center portion in a non-dispersive direction, which is orthogonal to the dispersive direction of light, may have a blaze wavelength smaller than a blaze wavelength of grooves positioned on an outer side in the non-dispersive direction.

According to such a structure, an aberration (an astigmatism or the like) caused by a difference in position in the non-dispersive direction in the diffraction grating can be corrected with a simple structure.

(5) The at least some grooves and the other grooves may have different blaze wavelengths due to that the at least some grooves have a depth different from a depth of the other grooves.

According to such a structure, an aberration occurring in the diffraction grating can be corrected with a simple structure in which the grooves are formed such that the depth is different between at least a portion of the irradiation region of the diffraction grating and the other portion of the irradiation region of the diffraction grating.

(6) Further, the irradiation region is formed by a concave surface.

According to such a structure, an aberration (a spherical aberration or the like) caused by that the irradiation region is a concave surface can be corrected with a simple structure.

(7) Further, the irradiation region may diffract light such that diffraction efficiencies for respective wavelengths are different from each other, and focusing distributions of lights diffracted by respective irradiation portions may be different from each other. Resolution in a wavelength range to be used may be increased by making the blaze wavelength of the at least some grooves among the multiple grooves of the irradiation region to be different from that of the other grooves.

According to such a structure, the resolution can be increased by using the characteristics of the irradiation region.

(8) Further, the blaze wavelength of the at least some grooves may be a first blaze wavelength on a short wavelength side. The blaze wavelength of the other groove may be a second blaze wavelength on a long wavelength side relative to the first blaze wavelength. Of the light diffracted by the irradiation region, an aberration appearing on a short wavelength side relative to the second blaze wavelength may be corrected.

According to such a structure, of the diffracted light, an aberration appearing on the short wavelength side can be efficiently corrected.

(9) Further, the blaze wavelength of the at least some grooves may be a first blaze wavelength on a short wavelength side. The blaze wavelength of the other groove may be a second blaze wavelength on a long wavelength side relative to the first blaze wavelength. A ratio of the second blaze wavelength to the first blaze wavelength may be 1.5-2.5.

According to such a structure, in the irradiation region, grooves having optimal blaze wavelengths for correcting an aberration can be formed.

(10) A spectral device according to the present invention includes the diffraction grating and a detector. The detector detects light spectrally dispersed by the diffraction grating.

Effect of Invention

According to the present invention, the grooves are formed such that the blaze wavelength is different between at least a portion of the irradiation region of the diffraction grating and the other portion of the irradiation region of the diffraction grating. Therefore, an aberration occurring in the diffraction grating can be corrected with a simple structure.

MODE FOR CARRYING OUT THE INVENTION

1. Overall Structure of Spectral Device

Figure 1:
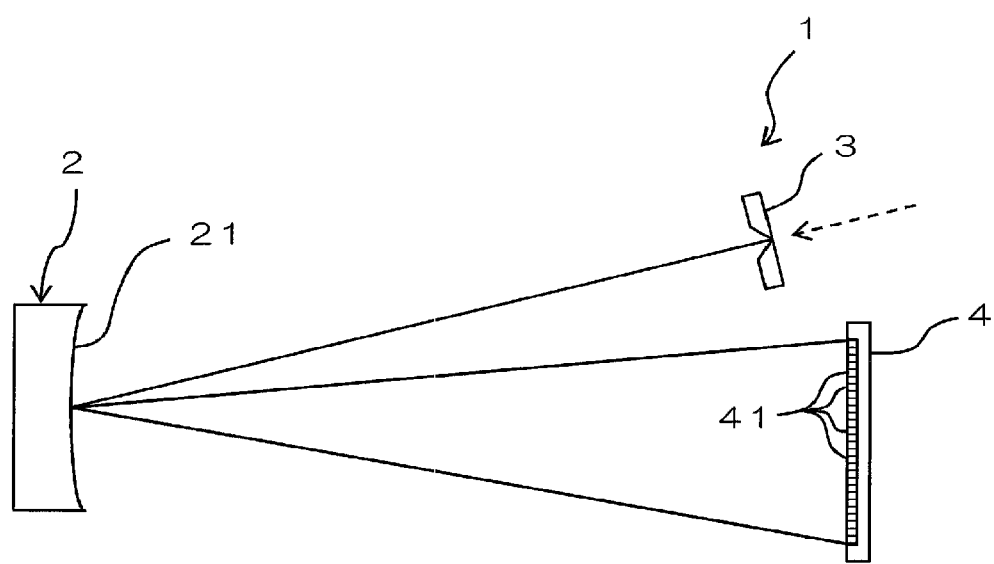
FIG. 1 is a schematic diagram illustrating a structural example of a spectral device according to a first embodiment of the present invention.

FIG. 1 is a schematic diagram illustrating a structural example of a spectral device 1 according to a first embodiment of the present invention.

The spectral device 1 is a device for spectrally dispersing irradiated light into lights of respective wavelengths, and includes a diffraction grating 2, an incident slit 3, and a detector 4.

The diffraction grating 2 is a so-called reflection type diffraction grating that reflects and spectrally disperses incident light, and diffracts light irradiated onto an irradiation region 21 and spectrally disperses the light into lights of respective wavelengths. The irradiation region 21, which is a reflection surface of the diffraction grating 2, is formed by a concave surface.

The incident slit 3 is arranged between the diffraction grating 2 and a light source (not illustrated in the drawings). A slit (not illustrated in the drawings) having a predetermined width is formed in the incident slit 3, and light from the light source passes through the slit and is incident on the diffraction grating 2.

The detector 4 is arranged so as to oppose the irradiation region 21 of the diffraction grating 2. The detector 4 is for detecting the spectrally dispersed light and is formed of, for example, a photodiode array. The detector 4 is formed, for example, by arranging multiple light receiving elements 41. Lights of wavelengths respectively corresponding to positions of the light receiving elements 41 are respectively incident on the light receiving elements 41.

Light emitted from the light source passes through the incident slit 3 and is incident on the irradiation region 21 of the diffraction grating 2. In this case, the light is incident on substantially the entire region of the irradiation region 21 of the diffraction grating 2. In FIG. 1, for convenience, only a portion of the light incident on the irradiation region 21 of the diffraction grating 2 is illustrated. When the light incident on the diffraction grating 2 is reflected by the irradiation region 21 of the diffraction grating 2, the light is spectrally dispersed into lights of respective wavelengths. The spectrally dispersed light is received by detector 4.

The detector 4 outputs detection signals based on received light intensities at the light receiving elements 41. Thereafter, for example, based on the detection signals output from the detector 4, various kinds of data processing are per-formed. Then, a data processing result is displayed on a display unit (not illustrated in the drawings).

2. Detailed Structure of Diffraction Grating

Figure 2:
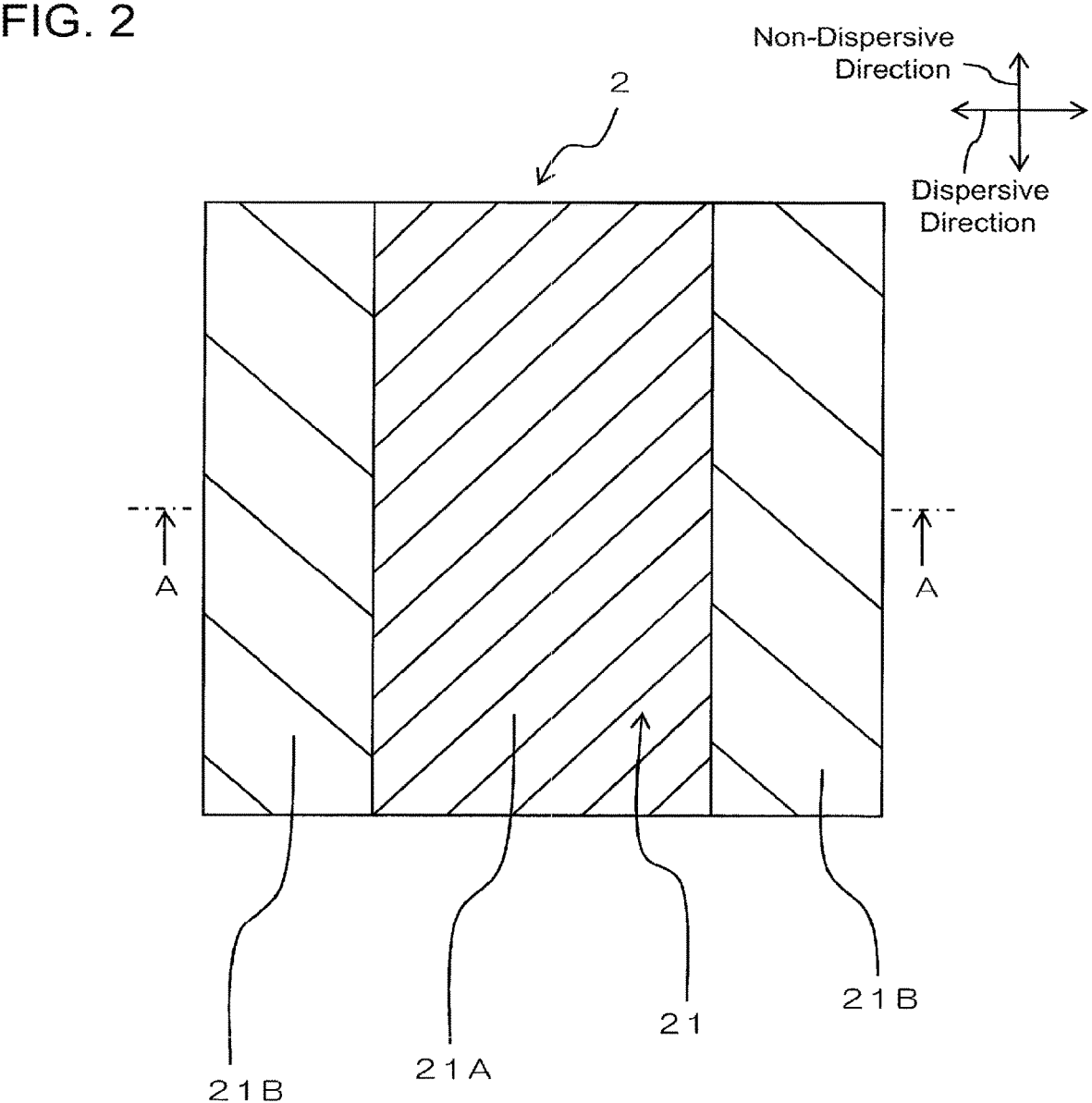
FIG. 2 is a front view schematically illustrating a diffraction grating of the spectral device of FIG. 1.
Figure 3:
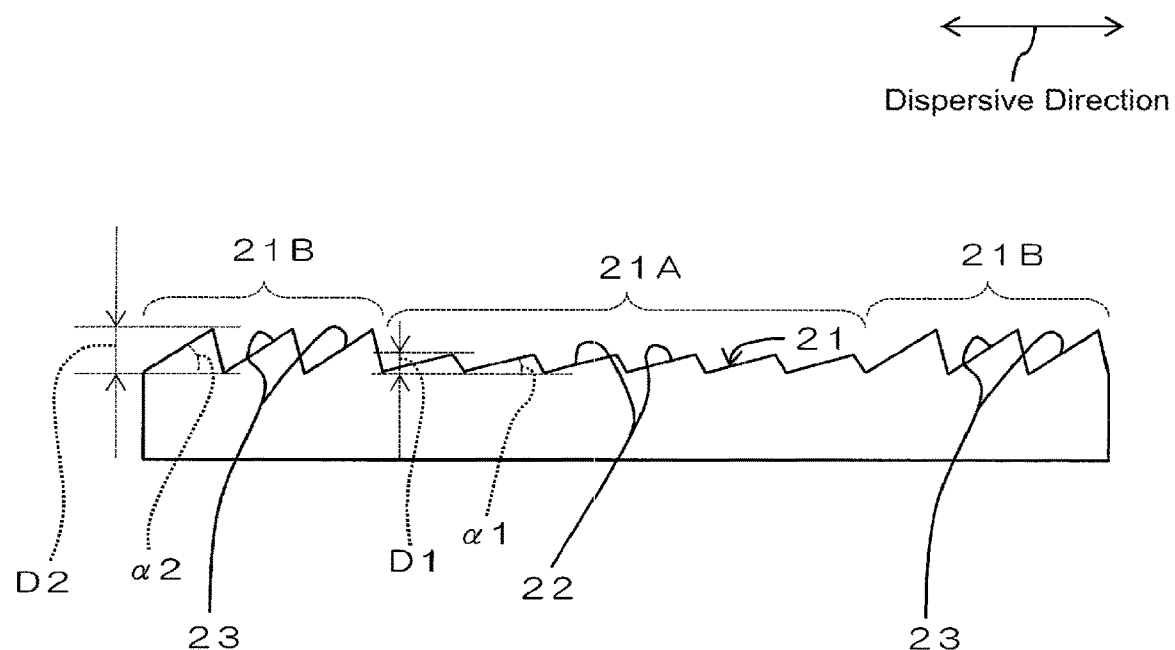
FIG. 3 is a cross-sectional view along an A-A line in FIG. 2.

FIG. 2 is a front view schematically illustrating the diffraction grating 2. FIG. 3 is a cross-sectional view along an A-A line in FIG. 2.

The irradiation region 21, which is the reflection surface of the diffraction grating 2, is formed by a concave surface as described above, and forms a front surface of the diffraction grating 2. In FIG. 3, for convenience, the concave irradiation region 21 is illustrated in a planar shape. The irradiation region 21 is formed in a rectangular shape in a front view (a square shape in a front view). The irradiation region 21 includes a first irradiation region (21A) and a second irradiation region (21B).

The first irradiation region (21A) is positioned in a center portion of the irradiation region 21. Specifically, the first irradiation region (21A) is positioned in a center portion in a dispersive direction of light in the diffraction grating 2. The dispersive direction is a direction in which the light reflected by the diffraction grating 2 is dispersed. In FIG. 2, a left-right direction is illustrated as the dispersive direction, and an up-down direction is illustrated as a non-dispersive direction which is orthogonal to the dispersive direction. The first irradiation region (21A) is positioned in the entire irradiation region 21 in the non-dispersive direction.

As illustrated in FIG. 3, multiple grooves 22 for diffracting light are formed in the first irradiation region (21A). The multiple grooves 22 are serrated and are formed so as to extend along the non-dispersive direction in the first irradiation region (21A). The multiple grooves 22 are arranged at substantially equal intervals in the dispersive direction. A depth (height) (D1) of each of the grooves 22 is, for example, about 100 nm when the number of the grooves is 300 per mm and a blaze wavelength is 200 nm. Further, an angle ($\alpha 1$) (a slope of each of the grooves 22) formed by a sloped surface of each of the grooves 22 and the dispersive direction is, for example, 1°-2°, and preferably about 1.7°. The grooves 22 of the first irradiation region (21A) are an example of at least some grooves.

As illustrated in FIGS. 2 and 3, the second irradiation region (21B) is positioned on an outer side of the irradiation region 21 (region other than the center portion) in the dispersive direction, and is positioned in the entire irradiation region 21 in the non-dispersive direction. That is, the second irradiation region (21B) is positioned on an outer side of the first irradiation region (21A) in the dispersive direction in a manner sandwiching the first irradiation region (21A).

As illustrated in FIG. 3, multiple grooves 23 for diffracting light are formed in the second irradiation region (21B). The multiple grooves 23 are serrated and are formed so as to extend along the non-dispersive direction in the second irradiation region (21B). The multiple grooves 23 are arranged at substantially equal intervals in the dispersive direction. A depth (D2) of each of the grooves 23 is deeper than the depth (D1) of the grooves 22 of the first irradiation region (21A). The depth (D2) is, for example, about 200 nm when the number of the grooves is 300 per mm and a blaze wavelength is 400 nm. Further, an angle ($\alpha 2$) (a slope of each of the grooves 23) formed by a sloped surface of each of the grooves 23 and the dispersive direction is larger than the slope ($\alpha 1$) of the grooves 22 of the first irradiation region (21A). The angle ($\alpha 2$) (slope ($\alpha 2$)) is, for example, 3°-4°, and preferably about 3.4°. The grooves 23 of the second irradiation region (21B) are an example of other grooves.

Further, in this example, a size in the dispersive direction of the irradiation region 21 is about 25 mm and a size in the non-dispersive direction of the irradiation region 21 is about 25 mm. Further, a size in the dispersive direction of the first irradiation region (21A) is about 12.5 mm. Further, a size in the dispersive direction of the second irradiation region (21B) arranged on one side (the right side in FIG. 2) in the dispersive direction with respect to the first irradiation region (21A), and a size in the dispersive direction of the second irradiation region (21B) arranged on the other side (the left side in FIG. 2) in the dispersive direction with respect to the first irradiation region (21A), are each about 6.25 mm. Further, the irradiation region 21 has a curvature radius of about 100 mm. Further, the number of grooves 22 formed per unit size in the first irradiation region (21A), and the number of grooves 23 formed per unit size in the second irradiation region (21B), are each about 300 per mm. In FIG. 3, in order to facilitate understanding of the description, the numbers of the grooves (22, 23) illustrated are less than the actual numbers.

3. Diffraction Efficiency of Diffraction Grating

In the diffraction grating, in general, a degree of diffraction of light is represented as a diffraction efficiency. The diffraction efficiency is a value indicating how much energy can be extracted as diffracted light out of energy of light incident on the diffraction grating. That is, when light is incident on a diffraction grating having a high diffraction efficiency, the light is reflected with a high energy; and when light is incident on a diffraction grating having a low diffraction efficiency, the light is reflected with a low energy. In the diffraction grating, a diffraction efficiency is determined for each wavelength of light to be spectrally dispersed; and, for a different wavelength, the diffraction efficiency also differs. And, the diffraction efficiency corresponds to a shape of a groove formed in the diffraction grating.

Figure 4:
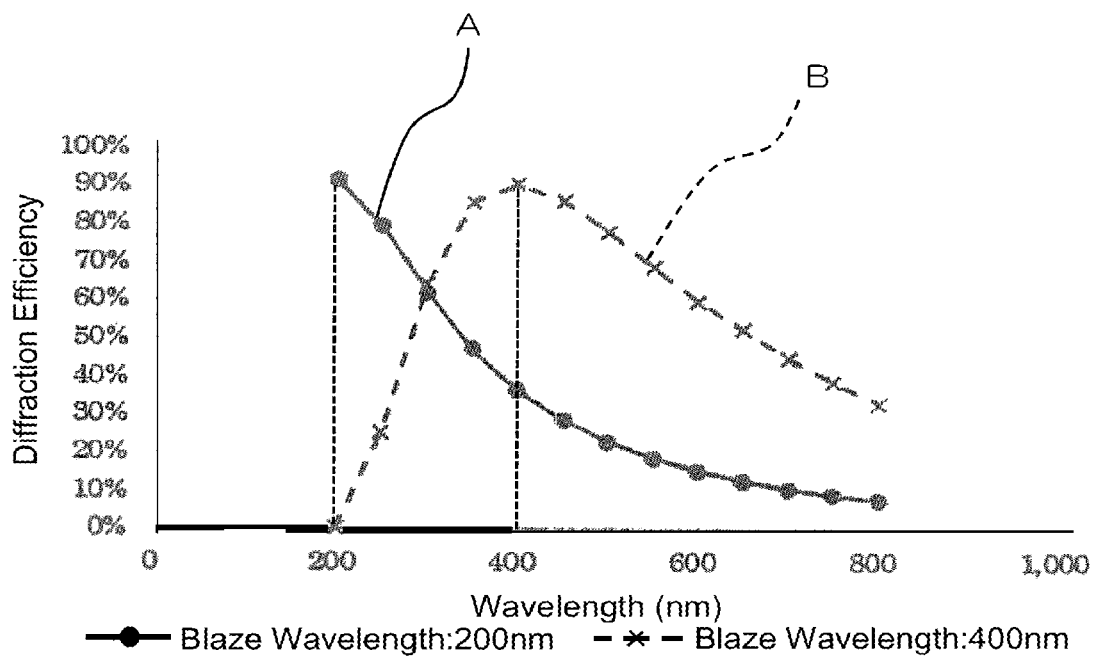
FIG. 4 illustrates graphs illustrating relationships between a diffraction efficiency and a wavelength in a first irradiation region and a second irradiation region of the diffraction grating of FIG. 2.

FIG. 4 illustrates graphs illustrating relationships between the diffraction efficiency and the wavelength in the first irradiation region (21A) and in the second irradiation region (21B) of the diffraction grating 2. Specifically, in FIG. 4, a graph A illustrates a relationship between the diffraction efficiency and the wavelength in the first irradiation region (21A) of the diffraction grating 2, and a graph B illustrates a relationship between the diffraction efficiency and the wavelength in the second irradiation region (21B) of the diffraction grating 2.

In the diffraction grating 2, the grooves 22 formed in the first irradiation region (21A) and the grooves 23 formed in the second irradiation region (21B) are different in shape (depth). Therefore, as illustrated by the graphs A and B, the relationship between a wavelength of light to be spectrally dispersed and a diffraction efficiency is (diffraction efficiencies for respective wavelengths of light after being spectrally dispersed are) different between the first irradiation region (21A) and the second irradiation region (21B).

Specifically, in the graph A, when the wavelength of the light to be spectrally dispersed is 200 nm, the diffraction efficiency peaks and has a value of about 90%.

Here, in general, a wavelength at which the diffraction efficiency peaks (the diffraction efficiency has a maximum value) is referred to as a blaze wavelength. That is, as illustrated by the graph A, the blaze wavelength of the first irradiation region (21A) of the diffraction grating 2 (the blaze wavelength of the grooves 22 of the first irradiation region (21A)) is 200 nm. The blaze wavelength of the first irradiation region (21A) is an example of a first blaze wavelength.

Further, in general, in the diffraction grating, when the wavelength of the light to be spectrally dispersed becomes longer than the blaze wavelength, the diffraction efficiency gradually decreases; and, when the wavelength of the light to be spectrally dispersed becomes shorter than the blaze wavelength, the diffraction efficiency rapidly decreases, and the diffraction efficiency is nearly zero at a wavelength half of the blaze wavelength. That is, as illustrated by the graph A, in the first irradiation region (21A) of the diffraction grating 2, when the wavelength of the light to be spectrally dispersed becomes longer than 200 nm which is the blaze wavelength, the diffraction efficiency gradually decreases. Further, although not illustrated in the graph A, in the first irradiation region (21A) of the diffraction grating 2, when the wavelength of the light to be spectrally dispersed becomes shorter than 200 nm which is the blaze wavelength, the diffraction efficiency rapidly decreases.

In the graph B, when the wavelength of light to be spectrally dispersed is 400 nm, the diffraction efficiency peaks and has a value of about 90%. That is, as illustrated by the graph B, the blaze wavelength of the second irradiation region (21B) of the diffraction grating 2 (the blaze wavelength of the grooves 23 of the second irradiation region (21B)) is 400 nm. The blaze wavelength of the second irradiation region (21B) is an example of a second blaze wavelength.

A ratio of the blaze wavelength (the second blaze wavelength) of the second irradiation region (21B) to the blaze wavelength the (first blaze wavelength) of the first irradiation region (21A) is 2. In the present embodiment, this ratio is 2. However, this ratio can also take other values. For example, the ratio of the blaze wavelength (the second blaze wavelength) of the second irradiation region (21B) to the blaze wavelength (the first blaze wavelength) of the first irradiation region (21A) may be 1.5-2.5.

In the second irradiation region (21B) of the diffraction grating 2, when the wavelength of the light to be spectrally dispersed becomes longer than 400 nm which is the blaze wavelength, the diffraction efficiency gradually decreases; and, when the wavelength of the light to be spectrally dispersed becomes shorter than 400 nm which is the blaze wavelength, the diffraction efficiency rapidly decreases. As illustrated by the graph B, in the second irradiation region (21B) of the diffraction grating 2, the diffraction efficiency becomes about 0% when the wavelength of the light to be spectrally dispersed becomes 200 nm.

In this way, in the irradiation region 21 of the diffraction grating 2, light is diffracted such that the diffraction efficiencies for the respective wavelengths are different from each other. Further, in the diffraction grating 2, the blaze wavelength is different between the first irradiation region (21A) and the second irradiation region (21B) (between the grooves 22 of the first irradiation region (21A) and the grooves 23 of the second irradiation region (21B)). Specifically, the blaze wavelength of the first irradiation region (21A) (the grooves 22 of the first irradiation region (21A)) is smaller (shorter) than the blaze wavelength of the second irradiation region (21B) (the grooves 23 of the second irradiation region (21B). That is, the blaze wavelength of the first irradiation region (21A) is a blaze wavelength on a short wavelength side, and the blaze wavelength of the second irradiation region (21B) is a blaze wavelength on a long wavelength side relative to the blaze wavelength of the first irradiation region (21A).

Figure 5:
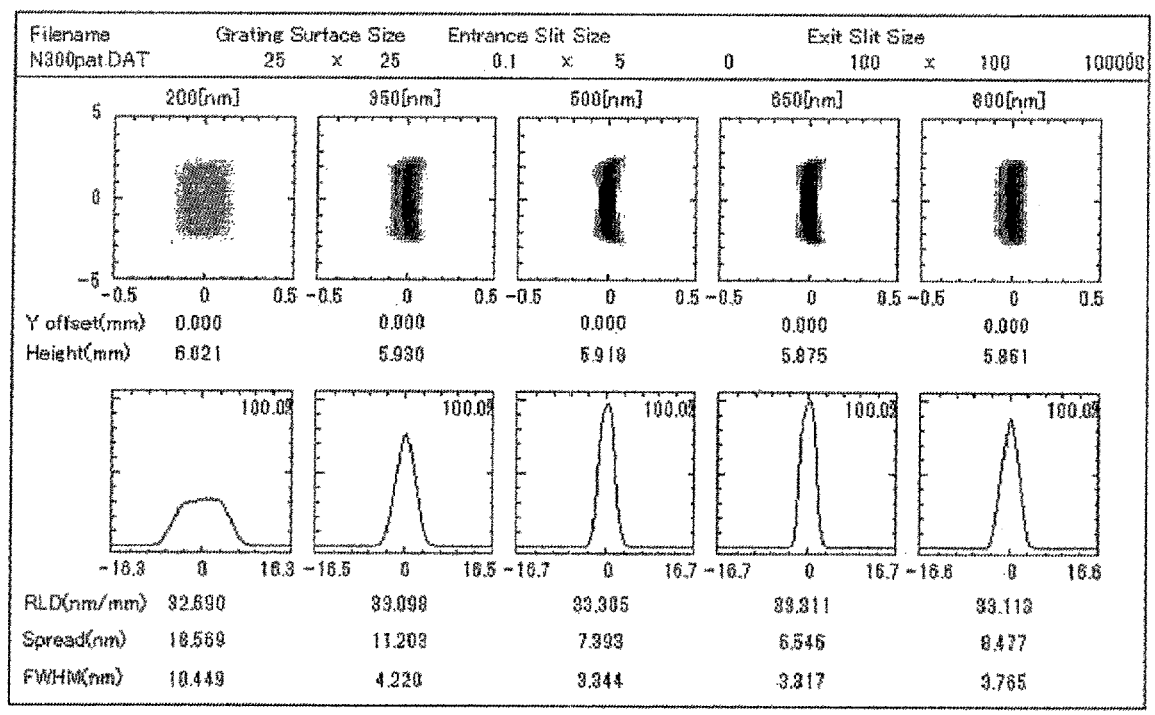
FIG. 5 illustrates light appearances and signal intensities for respective wavelengths of light spectrally dispersed by an entire irradiation region of a conventional diffraction grating.
Figure 6:
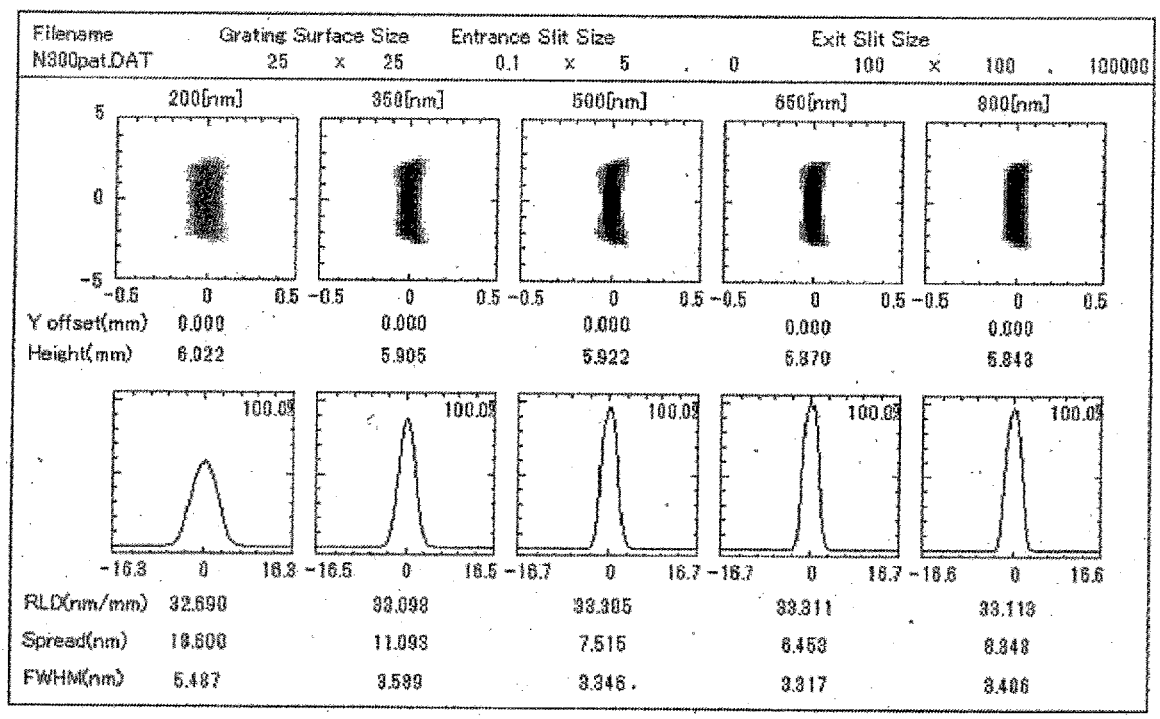
FIG. 6 illustrates light appearances and signal intensities for respective wavelengths of light spectrally dispersed by a center region of the conventional diffraction grating.
Figure 7:
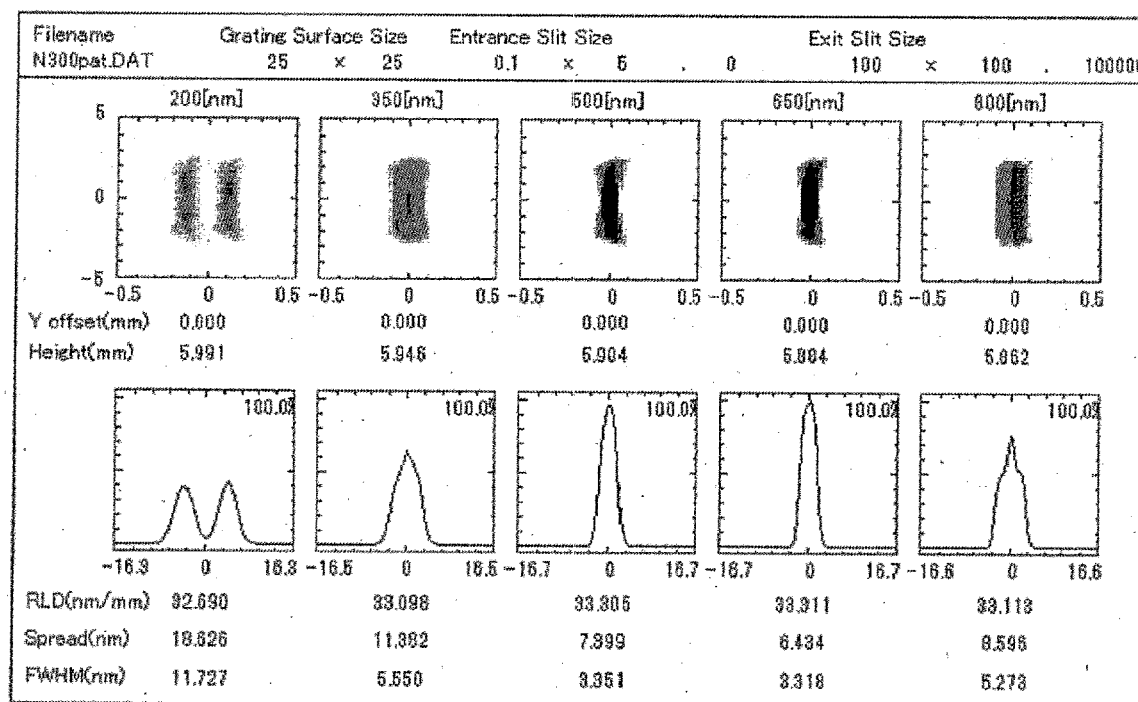
FIG. 7 illustrates light appearances and signal intensities for respective wavelengths of light spectrally dispersed by an edge region of the conventional diffraction grating.

4. Light Appearances and Signal Intensities for Respective Wavelengths in Conventional Diffraction Grating FIG. 5 illustrates light appearances and signal intensities for respective wavelengths of light spectrally dispersed by an entire irradiation region of a conventional diffraction grating. FIG. 6 illustrates light appearances and signal intensities for respective wavelengths of light spectrally dispersed by a center region of the conventional diffraction grating. FIG. 7 illustrates light appearances and signal intensities for respective wavelengths of light spectrally dispersed by an edge region of the conventional diffraction grating. A wavelength range (200 nm-800 nm) illustrated in the figures corresponds to a wavelength range of light to be detected by the detector 4 (see FIG. 1) and is a wavelength range used in the spectral device 1.

Specifically, FIG. 5 illustrates light appearances and signal intensities for respective wavelengths of light spectrally dispersed by an entire irradiation region of a diffraction grating when the diffraction grating, in which all grooves have the same depth, is arranged in place of the diffraction grating 2 in the spectral device 1 (see FIG. 1). Further, FIG. 6 illustrates light appearances and signal intensities for respective wavelengths in a case where light is irradiated only to a center portion of the irradiation region (a region corresponding to the first irradiation region (21A) of the diffraction grating 2) in the conventional diffraction grating 2) in the conventional diffraction grating for which the result illustrated in FIG. 5 is obtained. Further, FIG. 7 illustrates light appearances and signal intensities for respective wavelengths in a case where light is irradiated only to a region other than the center portion of the irradiation region (a region corresponding to the second irradiation region (21B) of the diffraction grating 2) in the conventional diffraction grating for which the result illustrated in FIG. 5 is obtained.

Further, in each of FIGS. 5-7, an upper side illustrates the light appearances for the respective wavelengths, and a lower side illustrates the signal intensities for the respective wavelengths. Further, in each of the figures, on the upper side, a horizontal axis indicates positions in the dispersive direction, and a vertical axis indicates positions in the non-dispersive direction. Further, in each of the figures, on the lower side, a horizontal axis indicates positions in the dispersive direction, and a vertical axis indicates signal intensities.

From FIGS. 5-7, it can be confirmed that, when the result of FIG. 7 is superimposed on the result of FIG. 6, the result of FIG. 5 is obtained. Further, it can be confirmed that focusing distribution (light appearance) of the diffracted light is different between the respective irradiation portions (the outer side portion and the center portion of the irradiation region). That the focusing distribution is different between the respective irradiation portions is mainly caused by that the irradiation region of the diffraction grating is a concave surface. Therefore, the same also applies to the irradiation region 21 of the diffraction grating 2.

Further, when focusing on FIG. 5, it can be confirmed that, when the conventional diffraction grating is used in place of the diffraction grating 2 in the spectral device 1, an aberration occurs on the short wavelength side. Specifically, when focusing on FIG. 5, it can be confirmed that, for the light of the wavelength of 200 nm, the contour of the light is blurred and the signal intensity is also low. Therefore, from this, it can be confirmed that an aberration has occurred in the light of the wavelength of 200 nm.

Further, in each of FIGS. 6 and 7, when focusing on the light of the wavelength of 200 nm, in FIG. 6, it can be confirmed that the contour of the light is relatively clear and the signal intensity is also relatively high. On the other hand, in FIG. 7, it can be confirmed that the light is divided into two, the contour of the light is blurred, and a waveform of the signal intensity having two peaks appears. That is, in FIG. 7, it can be confirmed that an aberration occurs in the light of 200 nm.

From this, it can be inferred that the aberration appearing in FIG. 5 is due to the aberration appearing in FIG. 7.

5. Light Appearances and Signal Intensities of Respective Wavelengths in Diffraction Grating of Spectral Device As described above, in the diffraction grating 2, the blaze wavelength of the first irradiation region (21A) (the grooves 22 of the first irradiation region (21A)) is smaller than the blaze wavelength of the second irradiation region (21B) (the grooves 23 of the second irradiation region (21B).

Further, as illustrated in FIG. 4, when focusing on the diffraction efficiency of the second irradiation region (21B) which is a region where the blaze wavelength is large (the region where the blaze wavelength is 400 nm) (when focusing on the graph B), when the wavelength of the light after being spectrally dispersed is 200 nm, the diffraction efficiency is about 0%.

Therefore, in the spectral device 1, of the light reflected by the second irradiation region (21B) of the diffraction grating 2, the light having a wavelength of 200 nm (the light corresponding to the aberration appearing in FIG. 7) is not diffracted and is not received by the detector 4.

Figure 8:
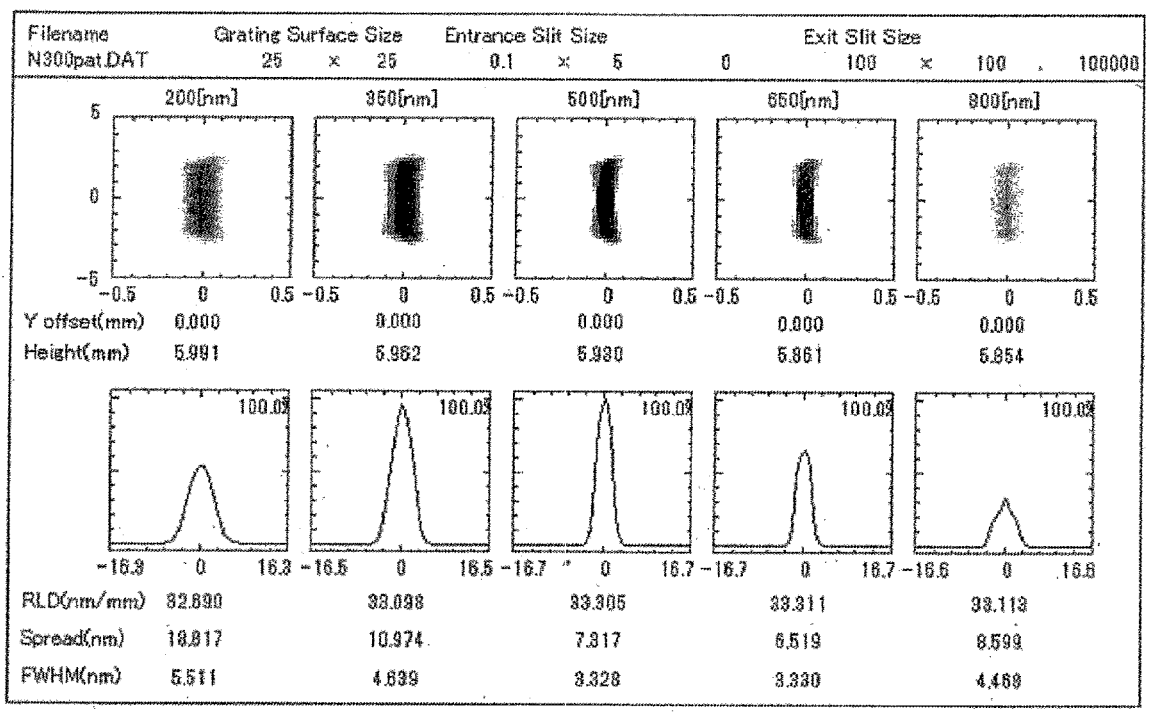
FIG. 8 illustrates light appearances and signal intensities for respective wavelengths of light spectrally dispersed by the diffraction grating of FIG. 2.

FIG. 8 illustrates light appearances and signal intensities for respective wavelengths of light spectrally dispersed by the diffraction grating 2.

In FIG. 8, as compared with FIG. 5, it can be confirmed that, on the short wavelength side, the contour of the light is clear and the signal intensity is also relatively high. In other words, it can be confirmed that, in the spectral device 1 (in the diffraction grating 2), resolution is high within the wavelength range to be used. That is, it can be confirmed that, in the spectral device 1 (in the diffraction grating 2), as a result that, in the second irradiation region (21B), the grooves 23 are formed such that the blaze wavelength is 400 nm and the diffraction efficiency of the light corresponding to the aberration appearing in FIG. 7 is 0%, the aberration appearing on the short wavelength side relative to the blaze wavelength (the second blaze wavelength) of the second irradiation region (21B) is corrected.

6. Operation Effect (1) In the present embodiment, in the diffraction grating 2, the blaze wavelength of the first irradiation region (21A) (the grooves 22 of the first irradiation region (21A)) is different from the blaze wavelength of the second irradiation region (21B) (the grooves 23 of the second irradiation region (21B). That is, as illustrated FIG. 4, the relationship between the wavelength of the light to be spectrally dispersed and the diffraction efficiency is (the diffraction efficiencies for the respective wavelengths of the light after being spectrally dispersed are) different between the first irradiation region (21A) and the second irradiation region (21B).

Therefore, in the spectral device 1, of the light reflected by the second irradiation region (21B) of the diffraction grating 2, the light having a wavelength of 200 nm (the light corresponding to the aberration appearing in FIG. 7) is not diffracted and is not received by the detector 4. That is, in the spectral device 1, an aberration on a short wavelength side is corrected.

In this way, in the diffraction grating 2, an aberration can be corrected with a simple structure in which the grooves (22, 23) are formed such that the blaze wavelengths in the first irradiation region (21A) and the second irradiation region (21B) are different from each other.

(2) Further, in the present embodiment, in the diffraction grating 2, the blaze wavelength of the first irradiation region (21A) (the grooves 22 of the first irradiation region (21A)) is smaller than the blaze wavelength of the second irradiation region (21B) (the grooves 23 of the second irradiation region (21B). Specifically, the blaze wavelength of the first irradiation region (21A) (the grooves 22 of the first irradiation region (21A)) is 200 nm, and the blaze wavelength of the second irradiation region (21B) (the grooves 23 of the second irradiation region (21B) is 400 nm.

Therefore, an aberration occurring in the diffraction grating 2 can be corrected with a simple structure in which the blaze wavelength of the first irradiation region (21A) (the grooves 22 of the first irradiation region (21A)) is made smaller than the blaze wavelength of the second irradiation region (21B) (the grooves 23 of the second irradiation region (21B)).

(3) Further, in the present embodiment, in the diffraction grating 2, the first irradiation region (21A) is positioned in the center portion in the dispersive direction, and the second irradiation region (21B) is positioned on the outer side in the dispersive direction. Then, the blaze wavelength of the first irradiation region (21A) (the grooves 22 of the first irradiation region (21A)) positioned in the center portion in the dispersive direction is smaller than the blaze wavelength of the second irradiation region (21B) (the grooves 23 of the second irradiation region (21B)) positioned on the outer side in the dispersive direction.

Therefore, an aberration (a spherical aberration, a coma aberration, or the like) caused by a difference in position (reflection position) in the dispersive direction in the diffraction grating 2 can be corrected with a simple structure.

(4) Further, in the present embodiment, as illustrated in FIG. 3, in the diffraction grating 2, the depth (D2) of the grooves 23 of the second irradiation region (21B) is different from the depth (D1) of the grooves 22 of the first irradiation region (21A). Specifically, the depth (D2) of the grooves 23 of the second irradiation region (21B) is deeper than the depth (D1) of the grooves 22 of the first irradiation region (21A).

Therefore, in the diffraction grating 2, an aberration can be corrected with a simple structure in which the depth (D2) of the grooves 23 of the second irradiation region (21B) is formed deeper than the depth (D1) of the grooves 22 of the first irradiation region (21A).

(5) Further, in the present embodiment, as illustrated in FIG. 1, the irradiation region 21 of the diffraction grating 2 is formed by a concave surface.

Therefore, an aberration (a spherical aberration or the like) caused by that the irradiation region 21 of the diffraction grating 2 is a concave surface can be corrected with a simple structure.

(6) Further, in the present embodiment, the irradiation region 21 of the diffraction grating 2 diffracts light such that the diffraction efficiencies for the respective wavelengths are different from each other, and the focusing distributions of the lights diffracted by the respective irradiation portions are different from each other. Then, in the irradiation region 21, by making the blaze wavelength different between the first irradiation region (21A) and the second irradiation region (21B), the resolution in the wavelength range to be used is increased.

Therefore, the resolution can be increased by using the characteristics of the irradiation region 21.

(7) Further, in the present embodiment, of the light diffracted by the irradiation region 21, an aberration appearing on a short wavelength side relative to the blaze wavelength (second blaze wavelength) of the second irradiation region (21B) is corrected.

That is, in the diffraction grating 2, of the diffracted light, an aberration appearing on the short wavelength side can be efficiently corrected.

(8) Further, in the present embodiment, the ratio of the blaze wavelength (second blaze wavelength) of the second irradiation region (21B) to the blaze wavelength (first blaze wavelength) of the first irradiation region is (21A) is 1.5-2.5, and preferably 2.

Therefore, in the irradiation region 21, grooves having optimal blaze wavelengths for correcting an aberration can be formed.

7. Second Embodiment

Figure 9:
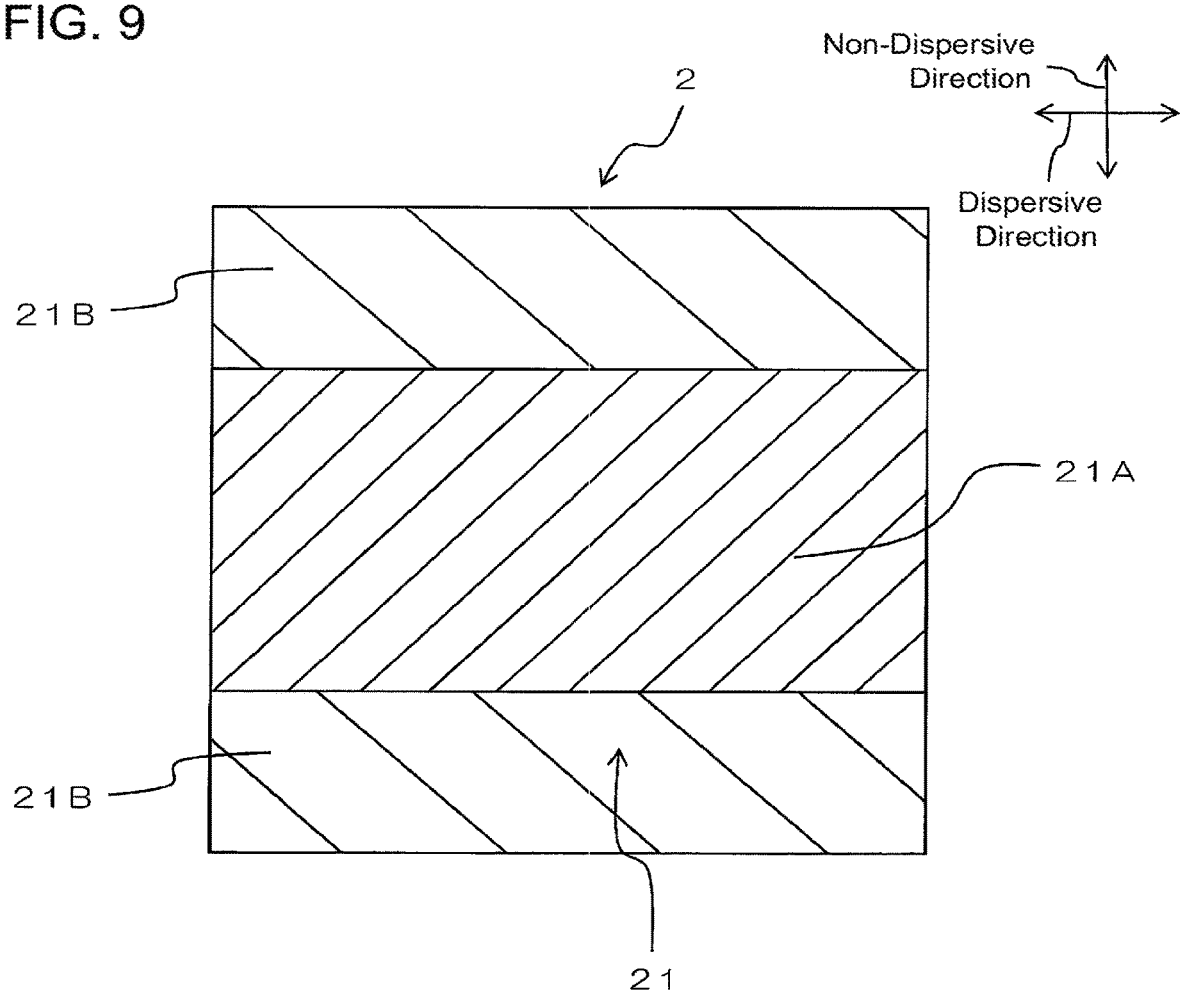
FIG. 9 is a front view schematically illustrating a diffraction grating according to a second embodiment of the present invention.
Figure 10:
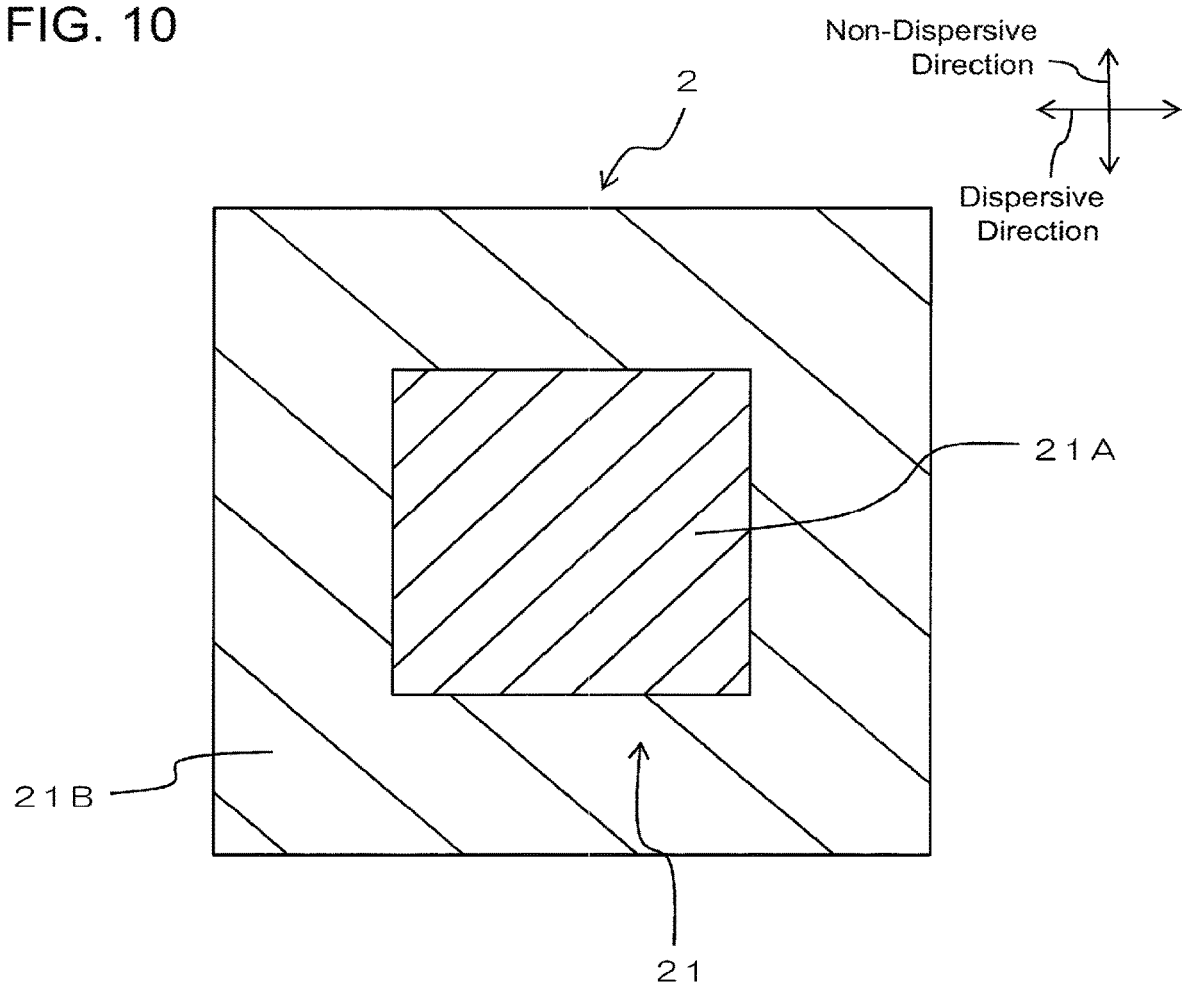
FIG. 10 is a front view schematically illustrating a diffraction grating according to a third embodiment of the present invention.

A second embodiment of the present invention is described using FIGS. 9 and 10. In the following description, a structural element that is the same as in the above-described first embodiment is indicated using the same reference numeral symbol and description thereof is omitted.

FIG. 9 is a front view schematically illustrating a diffraction grating 2 according to the second embodiment of the present invention.

In the above-described first embodiment, in the irradiation region 21 of the diffraction grating 2, in the dispersive direction, the first irradiation region (21A) is positioned in the center portion and the second irradiation region (21B) is positioned on the outer side.

In contrast, in the second embodiment, in the non-dispersive direction, a first irradiation region (21A) is positioned in a center portion and a second irradiation region (21B) is positioned on an outer side.

Specifically, in the second embodiment, the first irradiation region (21A) is positioned in the center portion of the irradiation region 21 in the non-dispersive direction and is positioned in the entire irradiation region 21 in the dispersive direction.

Further, the second irradiation region (21B) is positioned on an outer side of the irradiation region 21 in the non-dispersive direction so as to sandwich the first irradiation region (21A), and is positioned in the entire irradiation region 21 in the dispersive direction.

Although not illustrated in the drawing, similar to the first embodiment, grooves 22 are formed in the first irradiation region (21A), and grooves 23 are formed in the second irradiation region (21B).

In this way, in the second embodiment, in the diffraction grating 2, the blaze wavelength of the first irradiation region (21A) (the grooves 22 of the first irradiation region (21A)) positioned in the center portion in the non-dispersive direction is smaller than the blaze wavelength of the second irradiation region (21B) (the grooves 23 of the second irradiation region (21B)) positioned on the outer side in the non-dispersive direction.

Therefore, an aberration (an astigmatism or the like) caused by a difference in position in the non-dispersive direction in the diffraction grating 2 can be corrected with a simple structure.

8. Third Embodiment

FIG. 10 is a front view schematically illustrating a diffraction grating 2 according to a third embodiment of the present invention.

In the above-described first embodiment, in the irradiation region 21 of the diffraction grating 2, in the dispersive direction, the first irradiation region (21A) is positioned in the center portion and the second irradiation region (21B) is positioned on the outer side.

In contrast, in the third embodiment, in the dispersive direction and the non-dispersive direction, a first irradiation region (21A) is positioned in a center portion and a second irradiation region (21B) is positioned on an outer side.

Specifically, in the third embodiment, the first irradiation region (21A) is positioned in a center portion of the irradiation region 21 in the dispersive direction and is positioned in a center portion of the irradiation region 21 in the non-dispersive direction.

Further, the second irradiation region (21B) is positioned on an outer side of the irradiation region 21 in the dispersive direction so as to sandwich the first irradiation region (21A), and is positioned on an outer side of the irradiation region 21 in the non-dispersive direction so as to sandwich the first irradiation region (21A) That is, the second irradiation region (21B) surrounds an outer side of the first irradiation region (21A).

Although not illustrated in the drawing, similar to the first embodiment, grooves 22 are formed in the first irradiation region (21A), and grooves 23 are formed in the second irradiation region (21B).

In this way, in the third embodiment, in the diffraction grating 2, the blaze wavelength of the first irradiation region (21A) (the grooves 22 of the first irradiation region (21A)) positioned in the center portion in the dispersive direction and the non-dispersive direction is smaller than the blaze wavelength of the second irradiation region (21B) (the grooves 23 of the second irradiation region (21B)) positioned on the outer side in the dispersive direction and the non-dispersive direction.

Therefore, both an aberration caused by a difference in position in the dispersive direction and an aberration caused by a difference in position in the non-dispersive direction in the diffraction grating 2 can be corrected with a simple structure.

9. Modified Embodiment

In the above embodiments, the irradiation region 21 of the diffraction grating 2 is described as being formed by a concave surface. However, the irradiation region 21 of the diffraction grating 2 may also be formed by a surface other than a concave surface. For example, the irradiation region 21 of the diffraction grating 2 may be formed by a flat surface.

Further, in the above embodiments, the case was described where the diffraction grating 2 is a blaze type diffraction grating having the serrated grooves (22, 23). However, the present invention is not limited to such a blaze type diffraction grating, but is also applicable to other diffraction gratings such as a holographic diffraction grating having sinusoidal grooves and a lamina diffraction grating having rectangular grooves.

Further, in the above embodiments, the case was described where the spectral device 1 is a polychromator that simultaneously receives lights of respective wavelengths using the multiple light receiving elements 41. However, the present invention is also applicable to a monochromator that rotates the diffraction grating 2 and receives only light of a specific wavelength using one light receiving element.

Further, in the above embodiments, in the irradiation region 21 of the diffraction grating 2, in the dispersive direction or the non-dispersive direction, the first irradiation region (21A) is positioned in the center portion and the second irradiation region (21B) is positioned on the outer side. However, it is also possible that, in the dispersive direction or the non-dispersive direction, the irradiation region 21 of the diffraction grating 2 is divided into two regions having different blaze wavelengths. In this case, a ratio of the two regions is not necessarily 1:1, and may be, for example, 2:3 or 2:1.

DESCRIPTION OF REFERENCE NUMERALS

1: spectral device
2: diffraction grating
4: detector
21: irradiation region
21A: first irradiation region
21B: second irradiation region
22: grooves
23: grooves

What is claimed is:

1. A diffraction grating, comprising:
   a diffraction grating body having multiple grooves formed in an irradiation region thereof such that light irradiated onto the irradiation region is diffracted and spectrally dispersed into lights of respective wavelengths,
   wherein the irradiation region includes a first irradiation region positioned in a center portion of the irradiation region and a second irradiation region which is on an outer adjacent side of the first irradiation region, and which extends to a peripheral end region of the diffraction grating body in a dispersive direction of light,
   the multiple grooves include grooves formed in the first irradiation region and grooves formed in the second irradiation region,
   a blaze wavelength, which is a wavelength at which a diffraction efficiency peaks, is different between the grooves in the first irradiation region and the grooves in the second irradiation region,
   the irradiation region diffracts light such that diffraction efficiencies for respective wavelengths are different from each other, and focusing distributions of lights diffracted by respective irradiation portions are different from each other, and
   the blaze wavelength is made different between the grooves in the first irradiation region and the grooves in the second irradiation region such that resolution is increased in a wavelength range used for the diffraction grating.

2. The diffraction grating according to claim 1, wherein the blaze wavelength for the grooves positioned in the first irradiation region is smaller than the blaze wavelength for the grooves positioned in the second irradiation region.

3. The diffraction grating according to claim 1, wherein, among the multiple grooves, the blaze wavelength for the grooves positioned in the center portion in the dispersive direction is smaller than the blaze wavelength for grooves positioned on an outer side in the dispersive direction.

4. A diffraction grating that diffracts light irradiated onto an irradiation region and spectrally disperses the light into lights of respective wavelengths,
   wherein
   multiple grooves for diffracting light are formed in the irradiation region, and
   among the multiple grooves, the blaze wavelength is smaller for grooves positioned in a center portion in a non-dispersive direction, which is orthogonal to the dispersive direction of light, than a blaze wavelength for grooves positioned on an outer side in the non-dispersive direction.

5. The diffraction grating according to claim 1, wherein the blaze wavelength is different due to a difference in a depth between the grooves in the first irradiation region and the grooves in the second irradiation region.

6. The diffraction grating according to claim 1, wherein the irradiation region comprises a concave surface.

7. A diffraction grating that diffracts light irradiated onto an irradiation region and spectrally disperses the light into lights of respective wavelengths, wherein
   multiple grooves for diffracting light are formed in the irradiation region,
   a blaze wavelength which is a wavelength at which a diffraction efficiency peaks is different among the multiple grooves,
   the blaze wavelength for some of the multiple grooves is a first blaze wavelength on a short wavelength side,
   the blaze wavelength for the other of the multiple grooves is a second blaze wavelength on a long wavelength side relative to the first blaze wavelength, and,
   of light diffracted by the irradiation region, an aberration appearing on a short wavelength side relative to the second blaze wavelength is corrected.

8. A diffraction grating that diffracts light irradiated onto an irradiation region and spectrally disperses the light into lights of respective wavelengths, wherein
   multiple grooves for diffracting light are formed in the irradiation region,
   a blaze wavelength which is a wavelength at which a diffraction efficiency peaks is different among the multiple grooves,
   the blaze wavelength for some of the multiple grooves is a first blaze wavelength on a short wavelength side,
   the blaze wavelength for the other of the multiple grooves is a second blaze wavelength on a long wavelength side relative to the first blaze wavelength, and
   a ratio of the second blaze wavelength to the first blaze wavelength is 1.5-2.5.

9. A spectral device, comprising:
   the diffraction grating of claim 1; and
   a detector configured to detect light spectrally dispersed by the diffraction grating.

10. A spectral device, comprising:
    the diffraction grating of claim 4; and
    a detector configured to detect light spectrally dispersed by the diffraction grating.

11. A spectral device, comprising:
    the diffraction grating of claim 7; and
    a detector configured to detect light spectrally dispersed by the diffraction grating.

12. A spectral device, comprising:
    the diffraction grating of claim 8; and
    a detector configured to detect light spectrally dispersed by the diffraction grating.

* * * * *